United States Patent Office 3,309,423
Patented Mar. 14, 1967

3,309,423
BLOCK COPOLYMERS OF POLYMERIC DIANIONS
Gaetano F. D'Alelio, South Bend, Ind., assignor, by mesne assignments, to Dal Mon Research Co., Cleveland, Ohio, a corporation of Delaware
No Drawing. Filed Aug. 8, 1963, Ser. No. 300,899
17 Claims. (Cl. 260—885)

This invention relates to new, reactive polymeric compositions and to a process for preparing them. Generally, it deals with block copolymers of at least two monomers. More specifically, it deals with block copolymers comprising a chain of A monomers, $(A)_n$, as the core or nucleus of the polymer chain, to both ends of which are attached blocks of B monomers, thus $(B)_m(A)_{n_0}(B)_m$, wherein $n_0$ represents a numerical value of at least 4 and can be as high as 10,000 or more, and $m$ represents a numerical value of at least one to as high as $n_0$, and A and B represent the structural units derived from A monomers and B monomers.

It is a purpose of this invention to prepare $$(B)_m(A)_{n_0}(B)_m$$

block copolymers in which the A and B blocks differ substantially in their chemical properties, in which the B blocks contain chemically functional groups which permit post-reaction to be performed selectively only in the B block portions of the copolymer and not in the A block portion of the copolymer. This reactivity of the B block originates from chemical groups originally present in the B monomers. It is therefore a purpose of this invention to prepare block copolymers by a process wherein the functionally active groups in the B monomers necessary to confer reactivity to the copolymer are not lost or caused to undergo premature reaction of degradation in the copolymerization process.

Monomers of Class A may be written as $$CH_2{=}\overset{R}{\underset{P}{C}}$$

and those of Class B as $$CH_2{=}\overset{R}{\underset{Q}{C}}$$

in which R, P, and Q are fully defined hereinafter, and for the present purposes of demonstration, the A monomers may be illustrated by styrene, ethyl acrylate, methyl methacrylate, etc., and the B monomers by allyl methacrylate, vinyl allylbenzoate, etc. Some of the block copolymers of this invention using these monomers according to the structure $(B)_m(A)_{n_0}(B)_m$ are

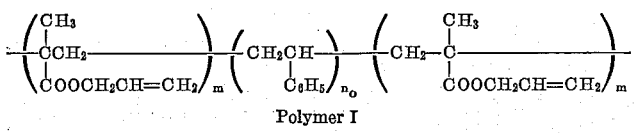
Polymer I

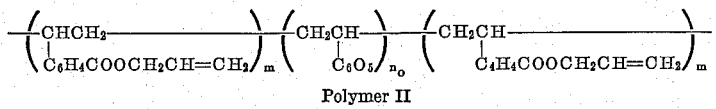
Polymer II

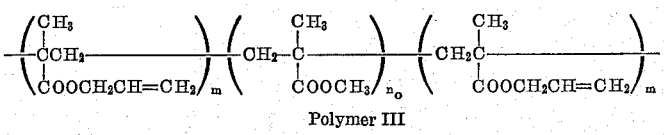
Polymer III

In these illustrative block copolymers, it will be noted that the functional group $-CH_2CH{=}CH_2$ is terminal in the copolymers and that the respective cores

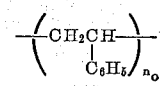

and

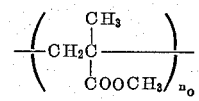

are not normally functional.

These three polymers are all reactive and can be converted to an insoluble, infusible state by various means, such as heat alone, free radical-generating catalysts, cationic catalysts, etc. Since the functional or reactive groups are terminal, they are readily available for post-reaction, and differ in this respect from statistical or random copolymers prepared from the same monomers in which many of the functional groups are sterically hindered or lost within the polymer mass and unavailable for post-reactions. The block copolymers of this invention also differ from copolymers of only two blocks, $(A)_{n_0}(B)_m$ in which post-reactions are performed on only one end of the chain, as for example, when such a polymer is cured or converted, the $(A)_n$ block of the polymer is still accessible to the swelling effect of solvents and to the softening effects of heat as in a styrene-allyl methacrylate copolymer, thus

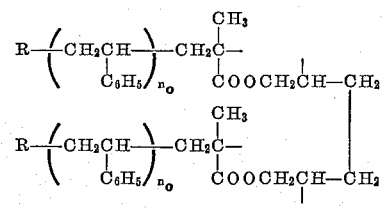

compared to a $(B)_m(A)_{n_0}(B)_m$ block copolymer in which both ends are reacted and anchored, thus,

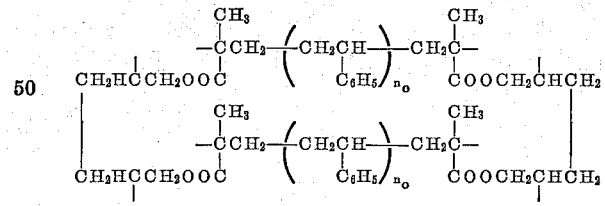

The block copolymers of this invention are prepared by reacting a polymeric dianion,

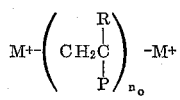

wherein M⁺ is a positive counter ion, typically an alkali metal, with monomers of the formula

wherein Q represents a post-reactable function, thus

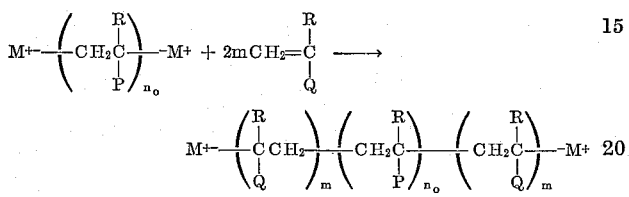

The polymer may be used as such or purified and freed of the M⁺ ions by washing with water, alcohols, acids, ammonia, etc., to give

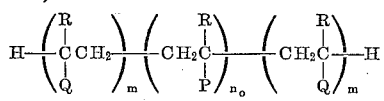

It is another object of this invention, in the preparation of the block copolymers of this invention, to graft at least one monomer of the class of

monomers to each end of a polymeric dianion of the general formula

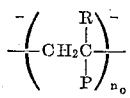

and to accomplish this synthesis through an anionic polymerization mechanism. This is in marked contrast to grafting a monomer to a polymeric mono-anion whether or not the grafted monomer contains a Q function, because in such case the grafted monomer is propagated as a block only to one end of the polymer as shown hereinabove.

By an anionic polymerization is meant a polymerization in which the propagation occurs by the progressive addition of monomers to an anion, at a specific rate, $k_p$, such as

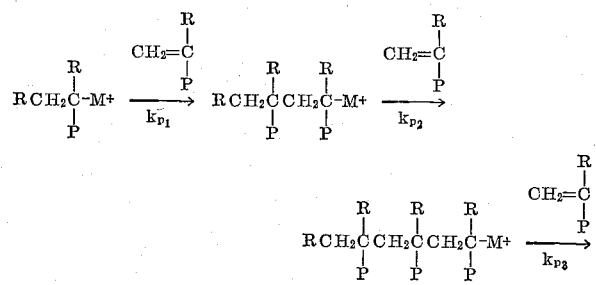

etc., in which M⁺ is a positive counter ion, typically an alkali metal. Many such anionic polymerizations are known.

This propagation step is preceded by an initiation step which can be brought about in numerous ways. The anion polymerization may be initiated by an alkali or alkaline earth metal hydride such as NaH, LiH, CaH₂, MgH₂, KH, CsH, etc. Such hydrides can also be in the form of complexes, for example, with other hydrides, e.g., KAlH₄, LiAlH₄, etc. By designating such anhydrides as MH, the initiating step is represented as

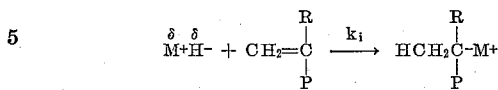

When an alkali metal hydrocarbon, $R_xM$, is used, the initiating step is given as

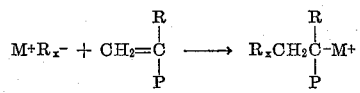

in which case the cation M⁺ represents Li, Na, K, Ca, Cs, etc. and the anion, $R_x^-$ represents a hydrocarbon radical, methyl, ethyl, propyl, isopropyl, butyl, amyl, isoamyl, cyclohexyl, benzyl, triphenyl methyl, octyl, etc., preferably containing no more than about 12 carbon atoms in the anion. A few typical examples of $MR_x$ are BuLi, $(C_6H_5)_3CNa$,

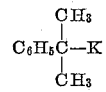

$C_6H_5CH_2Cs$, $CH\equiv CNa$, $CH_2=CHCH_2Li$, etc.

A Grignard also may be used to initiate the anionic polymerization, thus

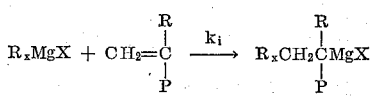

Illustrative examples of $R_xMgX$ in which X is a halogen and $R_x$ is as defined above are butyl magnesium bromide, vinyl magnesium bromide, allyl magnesium chloride, phenyl magnesium bromide and chloride, etc. In most cases, and with most monomers, such initiations produce only mono anions which are propagated as monoanions and accordingly, the blocks occur at only one end of the polymer chain. In most cases such blocks offer little or no advantage over a random copolymer.

However, there are large numbers of initiating systems which produce dianions in the initiating stage and these dianions propagate by the further addition of monomer at both ends to produce polymeric dianions suitable for the purposes of this invention. For example, with initiators of the formula $R_xM$, when $R_x$ represents an aromatic ring such as naphthalene, dianions are obtained. This is readily explained by a series of reactions involving ion radicals which couple to form dianions, thus:

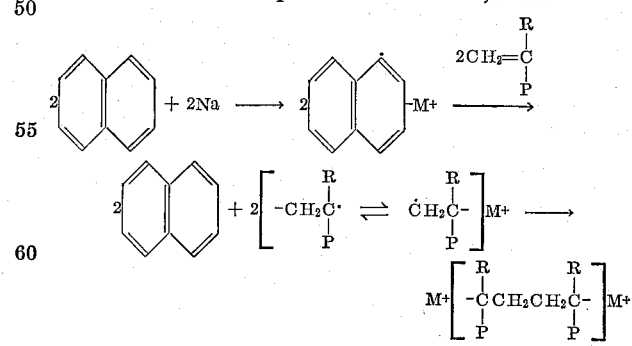

This same type of dianion is formed with anthracene, phenanthrene, naphthacene, acenaphthalene perylene, tetraphenyl ethylene, diphenyl acetylene, stilbene, etc.

The free alkali metals can also be used to initiate anionic polymerizations, especially when the metal, M·, gives up an electron to form an ion radical of the monomer, thus

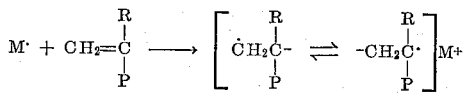

The ion radicals couple to form a dianion, thus $$2\overset{R}{\underset{P}{\overset{|}{C}}}H_2\overset{|}{C}-M^+ \longrightarrow {}^+M-\overset{R}{\underset{P}{\overset{|}{C}}}CH_2CH_2\overset{R}{\underset{P}{\overset{|}{C}}}-M^+$$

as a step in the initiating mechanism.

The alkali metals in liquid ammonia, and amines are also effective anionic initiators and they can function in two ways. For example, in the case of potassium, sodium or calcium in liquid ammonia, the amide which results from the reaction of the metal with ammonia acts as the initiator, thus $$K + NH_3 + CH_2=\overset{R}{\underset{P}{\overset{|}{C}}} \longrightarrow K^+NH_2^- + CH_3\overset{R}{\underset{P}{\overset{|}{C}}}H$$

and $$K^+NH_2^- + CH_2=\overset{R}{\underset{P}{\overset{|}{C}}} \longrightarrow NH_2CH_2\overset{R}{\underset{P}{\overset{|}{C}}}-K^+$$

However, in the case of lithium an ion radical is formed which acts as the initiator, thus $$Li + 2NH_3 \rightarrow Li^+(NH) + e^-(NH_3)$$

where $e^-$ is an electron, then $$2e^- + 2CH_2=\overset{R}{\underset{P}{\overset{|}{C}}} \longrightarrow 2\overset{R}{\underset{P}{\overset{|}{C}}}H_2\overset{|}{C}- \longrightarrow Li^+\overset{R}{\underset{P}{\overset{|}{C}}}CH_2CH_2\overset{R}{\underset{P}{\overset{|}{C}}}-Li^+$$

In a similar way dianionic initiation is brought about by ketyls which are the reaction products of an alkali or alkali metal with a ketone such as benzophenone in ethers. Thus $$2Na + 2C_6H_5COC_6H_5 \longrightarrow 2C_6H_5\overset{\overset{Na^+}{\underset{}{|}}}{\underset{}{\overset{O^-}{\underset{|}{C}}}}C_6H_5$$

which then react with the monomer, $$CH_2=\overset{R}{\underset{P}{\overset{|}{C}}}$$

to form a dianion, $$Na-\overset{R}{\underset{P}{\overset{|}{C}}}CH_2CH_2\overset{R}{\underset{P}{\overset{|}{C}}}-Na$$

regenerating the ketone. Dianions are also produced when α-methyl styrene is reacted with potassium, to produce a dimer, which structure is considered as being $$K-\overset{CH_3}{\underset{C_6H_5}{\overset{|}{C}}}CH_2CH_2\overset{CH_3}{\underset{C_6H_5}{\overset{|}{C}}}-K$$

If it is desired, prior to the addition of $$CH_2=\overset{R}{\underset{Q}{\overset{|}{C}}}$$

monomers to increase the size of the A block, then more $$CH_2=\overset{CH_3}{\underset{}{\overset{|}{C}}}C_6H_5$$

is added to the dimer, thus $$K-\overset{CH_3}{\underset{C_6H_5}{\overset{|}{C}}}CH_2CH_2\overset{CH_3}{\underset{C_6H_5}{\overset{|}{C}}}-K \xrightarrow{2nCH_2=\overset{CH_3}{\underset{}{\overset{|}{C}}}-C_6H_5}$$

$$-\left(\overset{CH_3}{\underset{C_6H_5}{\overset{|}{C}}}CH_2\right)_n\overset{CH_3}{\underset{C_6H_5}{\overset{|}{C}}}CH_2CH_2\overset{CH_3}{\underset{C_6H_5}{\overset{|}{C}}}\left(CH_2\overset{CH_3}{\underset{C_6H_5}{\overset{|}{C}}}\right)_n-$$

The same type of dianions are produced by starting with styrene dimers, styrene tetramers, etc.

Another class of dianions is that derived from the reaction of 1,3-dienes, with an alkali metal such as butadiene, isoprene, 2-phenylbutadiene-1,3; 2,3-diphenylbutadiene, triphenyl butadiene; tetraphenyl butadiene, etc., as illustrated by butadiene, $$CH_2=CH-CH=CH_2 + 2M \longrightarrow \overset{+}{M}CH_2CH=CH\overset{-}{C}H_2M^+$$

Individual dianions are more difficult to prepare from the diene-1,3 compounds than some of the other dianions described hereinabove since other side reactions can occur such as the formation of dimers, trimers, tetramers, etc. For example $$2M + nCH_2=CHCH=CH_2 \longrightarrow \overset{+}{M}-(CH_2CH=CHCH_2)_n-M^+$$

especially when Li metal is used which, in many respects, is similar to the α-methyl styrene dianions prepared using Li or K. When sodium or potassium is used, some 1,2 polymerization occurs with the dienes, such as $$M^+\left(CH_2CH=CHCH_2-CH_2\overset{}{\underset{\overset{CH}{\overset{\|}{CH_2}}}{\overset{|}{C}H}}\right)-M^+$$

In the above illustrations, the dianions become part of the central block of the polymer chain, and if the dianion is derived from a monomer which is desired in the central block, then the block can be prepared either in steps or in a single operation; but if the dianion is not derived from a monomer such as in the case of the naphthalene and ketyl types, or is derived from a monomer but a central core from another monomer is preferred, then the block can be built up by adding at least one monomer of the class of $$CH_2=\overset{R}{\underset{P}{\overset{|}{C}}}$$

monomers to the preformed dianion. Thus it can be seen that the central block, $$-\left(CH_2\overset{R}{\underset{P}{\overset{|}{C}}}\right)_{n_0}-$$

can be derived from a single $$CH_2=\overset{R}{\underset{P}{\overset{|}{C}}}$$

or from a multiplicity of monomers such as when 2, 3, 4 or more monomers are all introduced simultaneously so that random structures are obtained, or the monomers can be introduced consecutively so that internal regulated blocks are present in the central structure of the polymer, thus $$M-\left(\overset{}{\underset{COOC_2H_5}{\overset{|}{H}C-CH_2}}\right)_n\left(\overset{CH_3}{\underset{COOCH_3}{\overset{|}{C}-CH_2}}\right)_n\left(\overset{H}{\underset{C_6H_5}{\overset{|}{C}-H_2C}}\right)_n\overset{CH_3}{\underset{C_6H_5}{\overset{|}{C}}}-CH_2CH_2\overset{CH_3}{\underset{C_6H_5}{\overset{|}{C}}}\left(CH_2CH\overset{}{\underset{C_6H_5}{\overset{|}{}}}\right)_{n_0}\left(CH_2\overset{CH_3}{\underset{COOCH_3}{\overset{|}{C}}}\right)_n\left(CH_2CH\overset{}{\underset{COOC_2H_5}{\overset{|}{}}}\right)_n-M$$

instead of a random structure.

When the dianion is initially produced from a diene such as butadiene or isoprene, it also becomes part of the polymer chain containing unsaturation which is proportional to the amount of dianion, $$M^+ -(CH_2CH=CHCH_2)_{n'} - M^+$$

in the block, and the value of $n'$ in the initiating dianion. If oxidation resistance is desired in the final polymer, it is advisable to maintain the concentration of such interpolymerized initiators to less than 20–30 percent by weight of the final polymer.

For the purposes of this invention, the origin of the initiating dianion or the mechanism by which it is obtained is unimportant, for once the dianionic system is initiated it is responsible for the polymerization of monomers of the formula

to produce a polymeric dianion,

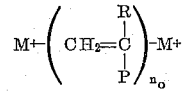

and to this preformed dianion, propagation is continued by the addition of monomers of the formula

to give the block copolymers of the structure,

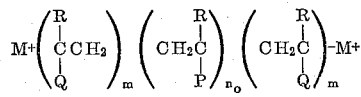

The average molecular weight, as expressed by the average degree of polymerization (DP) of the block copolymer, is given by the equation $$\overline{DP} = \frac{2\,[\text{Monomers}]}{[M^+]}$$

in which [Monomers] represents the molar concentration of monomers

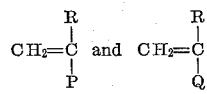

and [M+] represents the molar concentration of the positive cation. Anionic polymerizations are also known as base catalyzed polymerization.

The anionic polymerizations may be performed with the monomers of this invention in either the first stage in the preparation of the

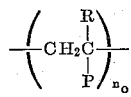

block, or in the second stage in the preparation of the

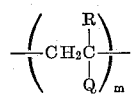

blocks. The monomers can be used alone, that is, in undiluted form, or in the presence of liquid diluents, and at temperatures ranging from about −80° C. to about 100° C. For most monomers the range of −40° C. to 80° C. is satisfactory; but generally −20° C. to about 60° C. is more practical. Both stages of the anionic polymerization may be performed at identical temperatures, or the first stage may be performed at either a higher or a lower temperature than the second stage.

The solvents or diluents, when used, may be selected from the class of aliphatic and aromatic hydrocarbons, ketones, ethers and esters such as butane, propane, hexane, heptane, octane, cyclohexane, cyclopentane, benzene, toluene, xylene, dimethyl ether, diethyl ether, dibutyl ether, tetrahydrofurane, dioxane, diphenyl ether, dibenzyl ether, dimethyl ethylene glycol ether, dibutyl ethylene glycol ether, diethyl diethylene glycol ether, etc. The diluene or solvent can also act to control the molecular weight of the polymerization by solvalitic chain transfer with the anion when protonic solvents are used, thus

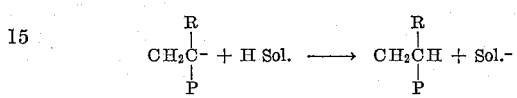

and

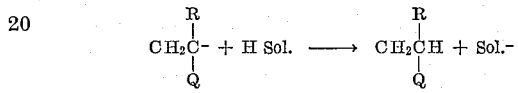

The block copolymers of this invention can be prepared to possess a very wide utility because of the large number of variables that can be readily controlled in their production. The corresponding properties will depend in great measure on the nature and character of the monomers used to prepare the central block, $(A)_{n_0}$, and whether this block is a homopolymeric block of only one

monomer, or a random copolymeric block of two or more

monomers alone or with other monomers, or whether it is a block within a block of two or more

monomers. They will also depend on the ratio of the total monomers in the $(A)_{n_0}$ block to the total monomers in the $(B)_m$ blocks. In the $(B)_m$ block the type of

monomers is important, and its activity will depend on the nature, character, and number of these monomers, whether one, two or more

monomers are used, and whether they are added as a block within a block or at random, etc. Accordingly, it may be appreciated that the nature of the

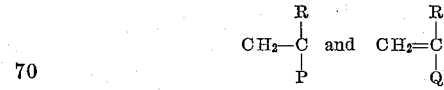

monomers are important in the practice of this invention. Moreover, it is obvious that they cannot contain in their structures functions or groups which react with or which destroy the anionic initiating system.

Monomers belonging to Class A are monomers having only one $CH_2=C<$ group and the general formula, $$CH_2=\underset{P}{\overset{R}{C}}$$

wherein R is selected from the class consisting of —H, —$CH_3$, and —CN, and P is selected from the class of —Ar, wherein —Ar is selected from the class of aryl radicals containing 6 to 12 carbon atoms and derivatives thereof, and the derivatives thereof selected from the class of alkyl, cycloalkyl and aryl groups containing no more than 12 carbon atoms;

—Ar—Y′, wherein —Ar— is selected from the class of arylene radicals and derivatives thereof, and the derivatives thereof selected from the class of alkyl, aryl, cycloalkyl, alkoxy, aryloxyl, thioalkyl, thioaryl, and Y′ represents a radical selected from the class of —$OR^{IV}$, $SR^{IV}$, —$COOR^{IV}$, —CN, —$O(CR_2^V)_nCOOR^{IV}$
—$S(CR_2^V)_nCOOR^{IV}$, —$(CR_2^V)_nOR^{IV}$, $(CR_2^V)_nSR^{IV}$
—$N(R^{IV})_2$, —$CON(R^{IV})_2$, —$(CR_2^V)_nN(R^{IV})_2$
$(CR_2^V)_nN(R^{IV})_2$, $(CR_2^V)_nCON(R^{IV})_2$
—$O(CR_2^V)_nCON(R^{IV})_2$, —$NR^{IV}(CR_2^V)_nCOOR^{IV}$
—$N[(CR_2^V)_nCOOR'']_2$ $$-\underset{\underset{NCOOR^{IV}}{|}}{R^{IV}}$$

—$(OCR_2^VCR_2^V)_nOR^{IV}$, —$CO(OCR_2^VCR_2^V)_nOR^{IV}$
$N(COOR^{IV})_2$ and $SO_2OR^{IV}$ wherein $R^V$ is a radical selected from the class of hydrogen and $R^{IV}$, and $R^{IV}$ is a hydrocarbon radical selected from the class of saturated aliphatic and cycloaliphatic radicals and aryl radicals and containing one to twelve carbon atoms, and $n$ represents a numerical value of one to ten;

—COY″, wherein Y″ is selected from the group consisting of

—$OR^{IV}$, —$SR^{IV}$, —$O(CR_2^V)_nCOOR^{IV}$
—$S(CR_2^V)_nCOOR^{IV}$, —$O(CR_2^V)_nOR^{IV}$, —$N(R^{IV})_2$
—$O(CR_2^V)_nCON(R^{IV})_2$, —$OCR_2^V(CR_2^V)_nN(R^{IV})_2$
—$S(CR_2^V)_nCON(R^{IV})_2$, —$SCR_2^V(CR_2^V)_nN(R^{IV})_2$
—$NCR_2^V(CR_2^V)_nN(R^{IV})_2$, $(OCR_2^VCR_2^V)_nOR^{IV}$ wherein $R^V$ is selected from the class of H and $R^{IV}$, and $R^{IV}$ is a hydrocarbon radical selected from the class of saturated aliphatic radicals, saturated cycloaliphatic radicals and aromatic radicals and containing one to twelve carbon atoms, and $n$ represents a numerical value of one to ten.

The structural unit in the polymers derived from the $$CH_2=\underset{P}{\overset{R}{C}}$$

monomers is $$-CH_2-\underset{P}{\overset{R}{C}}-$$

Illustrative examples of Class A monomers are:

$CH_2=CHCOOCH_3$,
$CH_2=CHCOOC_2H_5$,
$CH_2=CHCOOC_4H_9$,
$CH_2=CHCOOC_5H_{11}$,
$CH_2=CHCOOC_{18}H_{37}$,
$CH_2=CHCOOC_6H_5$,
$CH_2=CHCOOCH_2C_6H_5$,
$CH_2=CHCOOCH_2C(CH_3)_3$,
$CH_2=CHCOOCH(CH_3)_2$, $$CH_2=CHCOOCH\underset{CH_2CH_2}{\overset{CH_2CH_2}{\diagup\!\!\!\diagdown}}O,$$

$CH_2=CHCOOC_6H_4OCH_3$,
$CH_2=CHCOOC_6H_4OC_2H_5$,
$CH_2=C(CH_3)COOCH_3$,
$CH_2=C(CH_3)COOC_2H_5$,
$CH_2=C(CH_3)COOC_4H_9$,
$CH_2=C(CH_3)COOC_{18}H_{37}$,
$CH_2=C(CH_3)COOCH_2C_6H_5$,
$CH_2=CHCOSCH_3$,
$CH_2=CHCOSC_{18}H_{37}$,
$CH_2=C(CH_3)COSC_2H_5$,
$CH_2=CHCOOCH_2COOCH_3$,
$CH_2=CHCOOCH_2CH_2COOCH_3$,
$CH_2=CHCOOCH_2COOC_4H_9$,
$CH_2=CHCOOCH(CH_3)COOC_5H_{11}$,
$CH_2=C(CH_3)COOCH_2CH_2CH_2COOCH_3$,
$CH_2=CHCOSCH_2COOCH_3$,
$CH_2=CHCOOCH_2COSCH_3$,
$CH_2=CHCOSCH_2COSCH_3$,
$CH_2=CHCOOCH_2CH_2OCH_3$,
$CH_2=CHCO(OCH_2CH_2)_5OCH_3$,
$CH_2=C(CH_3)COO(CH_2)_6OC_2H_5$,
$CH_2=CHCOOCH_2CH_2N(CH_3)_2$,
$CH_2=CHCOOCH_2CH_2N(C_2H_5)_2$,
$CH_2=CHCOOCH_2CH_2N(C_4H_9)_2$,
$CH_2=CHCOOCH_2CH_2N(C_6H_5)_2$,
$CH_2=C(CH_3)COOCH_2CH_2N(CH_3)_2$,
$CH_2=C(CH_3)COOCH_2CH_2N(C_2H_5)_2$,
$CH_2=C(CH_3)COSCH_2CH_2N(C_2H_5)_2$,
$CH_2=CHCOOCH_2CON(C_2H_5)_2$,
$CH_2=C(CH_3)COOCH_2CON(C_4H_9)_2$,
$CH_2=CHCON(CH_3)_2$,
$CH_2=CHCON(C_2H_5)_2$,
$CH_2=CHCON(C_4H_9)_2$,
$CH_2=CHCON(CH_3)C_6H_5$,
$CH_2=CHCON(C_6H_5)_2$,
$CH_2=C(CH_3)CON(CH_3)_2$, $$CH_2=CHCO\underset{|}{N}(CH_2)_5CON(CH_3)_2,$$
$$\overset{CH_3}{}$$

$$CH_2=C(CH_3)CO\underset{|}{O}N(CH_2)_5CON(C_2H_5)_2,$$
$$\overset{CH_3}{}$$

$$CH_2=CHCO\underset{|}{N}(CH_2)_5COOCH_3,$$
$$\overset{CH_3}{}$$

$CH_2=CHCOOCH_2CH_2OCH_2CH_2N(CH_3)_2$,
$CH_2=CHCON[CH_2CON(CH_3)_2]_2$, $$CH_2=CHCO\underset{|}{O}NCH_2CH_2N(CH_3)_2,$$
$$\overset{CH_3}{}$$

$$CH_2=C(CH_3)CO\underset{|}{N}CH_2CH_2\underset{|}{N}CH_2CH_2N(CH_3)_2,$$
$$\overset{CH_3}{}\quad\overset{CH_3}{}$$

$CH_2=CHCN$,
$CH_2=C(CH_3)CN$,
$CH_2=C(CN)C_6H_5$,
$CH_2=C(CN)_2$,
$CH_2=C(CN)COOCH_3$,
$CH_2=C(CN)COOC_2H_5$,
$CH_2=C(CN)COOC_4H_9$,
$CH_2=C(CN)COOC_{18}H_{37}$,
$CH_2=C(CN)COOCH_2CH_2OCH_3$,
$CH_2=C(CN)COOCH_2CH_2OC_2H_5$,
$CH_2=C(CN)COOC_6H_5$,
$CH_2=C(CN)COOCH_2C_6H_5$,
$CH_2=C(CN)COOCH_2COOCH_3$,
$CH_2=C(CN)COSC_2H_5$,
$CH_2=C(CN)COOCH(CH_3)COOC_6H_{13}$,
$CH_2=C(CN)COSCH_2COOCH_3$,
$CH_2=C(CN)CO(OCH_2CH_2)_5OCH_3$,
$CH_2=C(CN)COOCH_2CH_2N(C_2H_5)_2$,
$CH_2=C(CN)COOCH_2CH_2N(C_4H_9)_2$,
$CH_2=C(CN)COOCH_2CH_2N(C_6H_5)_2$,
$CH_2=C(CN)COSCH_2CH_2N(C_2H_5)_2$,
$CH_2=C(CN)CON(CH_3)_2$,
$CH_2=C(CN)CON(C_2H_5)_2$,
$CH_2=C(CN)CON(C_4H_9)_2$,
$CH_2=C(CN)CON(CH_3)C_6H_5$, $CH_2=C(CN)CON(C_6H_5)_2$,
$CH_2=C(CN)CON(CH_3)CH_2CH_2N(C_2H_5)_2$,
$CH_2=C(CN)CON[(CH_2CON(CH_3)_2)]_2$,
$CH_2=CHC_6H_5$,
$CH_2=C(CH_3)C_6H_5$,
$CH_2=CHC_6H_4CH_3$,
$CH_2=CHC_6H_4C_6H_{12}$,
$CH_2=CHC_6H_3(CH_3)_2$,
$CH_2=C(CH_3)C_6H_4CH_3$,
$CH_2=CHC_6H_4CH(CH_3)_2$,
$CH_2=C(CH_3)C_6H_4CH(CH_3)_2$, $CH_2=\overset{CH_3}{\underset{|}{C}}C_6H_4OC_6H_5$, $CH_2=\overset{CH_3}{\underset{|}{C}}C_6H_4NHC_6H_5$, $CH_2=CHC_6H_4SC_6H_5$,
$CH_2=CHC_{10}H_7$,
$CH_2=C(CH_3)C_{10}H_7$,
$CH_2=C(CH_3)C_{10}HCH_3$,
$CH_2=CHC_4H_4CN$,
$CH_2=CHC_6H_4CH_2CN$,
$CH_2=C(CH_3)C_6H_4CN$,
$CH_2=CHC_6H_4C_{12}H_{25}$,
$CH_2=CHC_6H_4COOCH_3$,
$CH_2=CHC_6H_4COOC_2H_5$,
$CH_2=CHC_6H_4COOC_{18}H_{37}$,
$CH_2=C(CH_3)C_6H_4COOCH_3$,
$CH_2=C(CH_3)C_6H_4COOC_3H_7$,
$CH_2=C(CH_3)C_6H_4COOC_2H_5$,
$CH_2=CHC_6H_4COSCH_3$,
$CH_2=CHC_6H_4COSC_2H_5$,
$CH_2=C(CH_3)C_6H_4COSC_2H_5$,
$CH_2=CHC_6H_4CH_2COOC_2H_5$,
$CH_2=CHC_6H_4CH_2CH_2COOC_2H_5$,
$CH_2=CHC_6H_4CON(CH_3)_2$,
$CH_2=CHC_6H_4CON(C_2H_5)_2$,
$CH_2=C(CH_3)C_6H_4CON(C_4H_9)_2$,
$CH_2=CHC_6H_4CH_2CON(C_2H_5)_2$,
$CH_2=CHC_6H_4OCH_3$,
$CH_2=CHC_6H_4OC_4H_9$,
$CH_2=CHC_6H_4OC_{18}H_{37}$,
$CH_2=CHC_6H_4C_6H_4OCH_3$,
$CH_2=C(CH_3)C_6H_4OCH(CH_3)_2$,
$CH_2=C(CH_3)C_6H_4OC_5H_{11}$,
$CH_2=CHC_6H_4COOCH_2CH_2OCH_3$,
$CH_2=CHC_6H_4COOCH_2CH_2CH_2OC_6H_5$,
$CH_2=C(CH_3)C_6H_4COOCH_2CH_2OCH_3$,
$CH_2=CHC_6H_4COOCH_2COOCH_3$,
$CH_2=CHC_6H_4COOCH_2CH_2OCH_2CH_2OCH_3$,
$CH_2=C(CH_3)C_6H_4COOCH_2CH_2N(CH_3)_2$,
$CH_2=CHC_6H_4COOCH_2CH_2CH_2N(C_2H_5)_2$, $CH_2=CHC_6H_4C\overset{CH_3}{\underset{|}{ON}}CH_2CH_2N(C_2H_5)_2$, $CH_2=CHC_6H_4CH_2C\overset{CH_3}{\underset{|}{ON}}CH_2CH_2N(C_2H_5)_2$, $CH_2=CHC_6H_4OCH_2COOCH_3$,
$CH_2=C(CH_3)C_6H_4OCH_2COOC_2H_5$,
$CH_2=CHC_6H_4OCH_2CON(C_2H_5)_2$,
$CH_2=C(CH_3)OCH_2CON(C_2H_5)_2$,
$CH_2=C(CN)C_6H_4CH_3$,
$CH_2=C(CN)C_6H_3(CH_3)_2$,
$CH_2=C(CN)C_6H_4OCH_3$,
$CH_2=C(CN)C_6H_3(OCH_3)_2$,
$CH_2=C(CN)C_6H_4OC_5H_{11}$,
$CH_2=C(CN)C_6H_4OC_{18}H_{37}$,
$CH_2=C(CN)C_6H_4COOCH_3$,
$CH_2=C(CN)C_6H_4COOC_2H_5$,
$CH_2=C(CN)C_6H_4CON(CH_3)_2$,
$CH_2=C(CN)C_6H_4CON(C_2H_5)_2$,
$CH_2=C(CN)C_6H_4COOCH_2CH_2OCH_3$,
$CH_2=C(CN)C_6H_4COOCH_2CH_2N(CH_3)_2$, etc.

These Class A monomers can be polymerized anionically individually to produce a homoblock or with each other very readily to produce block A as a copolymer structure, as well as less readily with a variety of other monomers containing one or more negative substituents such as vinyl acetate, vinyl propionate, vinyl benzoate, dimethyl fumarate, diethyl fumarate, dimethyl maleate, diethyl maleate, dimethyl itaconate, methyl-β-cyanoethyl acrylate, diallyl maleate, diallyl fumarate, diallyl itaconate, etc., in which case any unconverted monomer can be removed by distillation or extraction, or even be allowed to remain admixed with the polymeric dianion during the second stage of grafting of the B monomers. In other cases, these monomers, which react poorly or very slowly, can be used as the solvent for both phases of the reaction.

The monomers of Class B have the general formula $$CH_2=\underset{Q}{\overset{R}{\underset{|}{C}}}$$

wherein

R is selected from the class of —H, —$CH_3$, and —CN;
Q is selected from the class consisting of —Ar—D, in which —Ar— is selected from the class consisting of arylene radicals and the derivatives thereof, in which each derivative is selected from the class consisting of alkyl, aryl, cycloalkyl, alkoxy, aryloxy, and cycloalkoxy groups, D represents a radical selected from the class consisting of —$(CR'_2)_nR''$, —$OR''$, —$SR''$, —$O(CR'_2)_nCOOR''$, —$S(CR'_2)COOR''$, —$COOR''$
—$(CR'_2)_nCOOR''$, —$(CR'_{2n}OR''$, —$(CR'_2)_nSR''$ $$-\underset{R''}{\overset{R'''}{\underset{|}{N}}}, -C\underset{R''}{\overset{R'''}{\underset{|}{ON}}}, -(CR'_2)_n\underset{R''}{\overset{R'''}{\underset{|}{N}}}, -(CR'_2)_nC\underset{R''}{\overset{R'''}{\underset{|}{ON}}}$$

$$-O(CR'_2)_nC\underset{R''}{\overset{R'''}{\underset{|}{ON}}}$$

—$NR'''(CR'_2)_nCOOR''$, —$N[(CR'_2)_nCOOR'']_2$ $$-\underset{|}{\overset{R'''}{N}}-COOR''$$

—$(OCR'_2CR'_2)_nOR''$, —$CO(OCR'_2CR'_2)_nOR''$

—$N(COOR'')$ and —SO $OR'''$, in which R' is a radical selected from the class consisting of hydrogen and hydrocarbon radicals containing one to ten carbon atoms and R'', R'' is a radical selected from the class of alkenyl, alkenyloxyalkyl, and alkenylthioalkyl radicals, said radicals containing two to ten carbon atoms and possessing a terminal $CH_2=C<$ group, R''' is a radical containing one to twelve carbon atoms of the class consisting of hydrocarbon, alkenyloxyalkyl and alkenylthioalkyl radicals, and n represents a numerical value of one to ten.
(Monomers of the formula $$CH_2=\overset{R}{\underset{|}{C}}-Ar-D$$

are disclosed in my copending applications Ser. Nos. 300,902 and 300,939 filed the same date herewith.)
—Ar—NCO;
—ArNCS;
—COD', in which D' is selected from the class consisting of —$OR''$, —$SR''$, —$O(CR'_2)_nCOOR''$, —$S(CR'_2)_nCOOR''$, —$O(CR'_2)_nOR''$ $$-\underset{R''}{\overset{R'''}{\underset{|}{N}}}, -SCR'_2(CR'_2)_n\underset{R''}{\overset{R'''}{\underset{|}{N}}}, -O-CR'_2(CR'_2)_n\underset{R''}{\overset{R'''}{\underset{|}{N}}}$$

$$-O-(CR'_2)_nC\underset{R''}{\overset{R'''}{\underset{|}{ON}}}, -S-(CR'_2)_nC\underset{R''}{\overset{R'''}{\underset{|}{ON}}}, -OCR'_2(CR'_2)_n\underset{R''}{\overset{R'''}{\underset{|}{N}}}$$

—$(OCR'_2CR'_2)_nOR''$, in which R', R'', and R''' are as defined above.

(Monomers corresponding to the formula $$CH_2=\overset{R}{\underset{|}{C}}-COD'$$

are disclosed in my copending application Ser. No. 300,939, filed the same date herewith, but under the general formula of $$CH_2=\overset{R}{\underset{|}{C}}-COY)$$

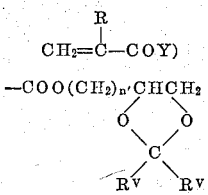

wherein $n'$ represents a numerical value of 1 to 4, and $R^v$ is a radical selected from the class consisting of H, alkyl, cycloalkyl and aryl radicals. (Monomers of this type are disclosed in U.S. Patents 2,680,735 and 2,877,215.)

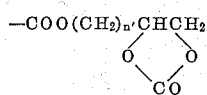

wherein $n'$ represents an integer of 1 to 4. (Monomers of this class are disclosed in U.S. Patent 2,967,173.)

$$\left(-N\begin{array}{c}CHR_b\\CO\end{array}\right)_5$$

wherein $R_b$ represents a radical selected from the group consisting of —H and —$CH_3$.

The structural unit in the polymers, derived from the $$CH_2=\overset{R}{\underset{|}{\underset{Q}{C}}}$$

monomers is $$-CH_2\overset{R}{\underset{|}{\underset{Q}{C}}}-$$

These Class B monomers can be grafted to a dianion block of A monomers, individually or as a mixture of different species of B monomers, or one species of B monomers can be grafted first, followed by a second species to produce a block within the B block, etc.

Illustrative examples of Class B, $$CH_2=\overset{R}{\underset{|}{\underset{Q}{C}}}$$

monomers are:

$CH_2$=CHCOOCH$_2$CH=CH$_2$,
$CH_2$=CHCOOCH=CH$_2$,
$CH_2$=C(CH$_3$)COOCH=CH$_2$,
$CH_2$=C(CH$_3$)COOCH$_2$CH=CH$_2$,
$CH_2$=CHCOOCH$_2$C(CH$_3$)=CH$_2$,
$CH_2$=C(CH$_3$)COOCH$_2$C(CH$_3$)=CH$_2$,
$CH_2$=CHCOOCH(CH$_3$)CH=CH$_2$,
$CH_2$=C(CN)COOCH$_2$CH=CH$_2$,
$CH_2$=C(CN)COOCH$_2$C(CH$_3$)=CH$_2$,
$CH_2$=CHCOSCH$_2$CH=CH$_2$,
$CH_2$=C(CH$_3$)COSCH$_2$CH=CH$_2$,
$CH_2$=CHCOOC$_6$H$_4$OCH$_2$CH=CH$_2$,
$CH_2$=C(CH$_3$)COOC$_6$H$_4$CH$_2$CH=CH$_2$,
$CH_2$=CHCOOC$_6$H$_4$OCH=CH$_2$,
$CH_2$=C(CH$_3$)COOC$_6$H$_4$OCH=CH$_2$,
$CH_2$=CHOOC$_6$H$_4$OCH$_2$CH=CH$_2$,
$CH_2$=C(CH$_3$)COOC$_6$H$_4$OCH$_2$CH=CH$_2$,
$CH_2$=CHCOOCH$_2$CH$_2$OCH=CH$_2$,
$CH_2$=CHCOOCH$_2$CH$_2$OCH$_2$CH=CH$_2$
$CH_2$=C(CH$_3$)COOCH$_2$CH$_2$OCH=CH$_2$,
$CH_2$=C(CH$_3$)COOCH$_2$CH$_2$OCH$_2$CH=CH$_2$,
$CH_2$=C(CN)COOCH$_2$CH$_2$OCH$_2$CH=CH$_2$,
$CH_2$=C(CN)COOCH$_2$CH$_2$OCH$_2$C(CH$_3$)=CH$_2$,
$CH_2$=CHCOO(CH$_2$)$_6$OCH$_2$CH=CH$_2$,
$CH_2$=CHCOS(CH$_2$)$_6$OCH$_2$CH=CH$_2$,
$CH_2$=CHCOOCH$_2$COOCH$_2$CH=CH$_2$,
$CH_2$=C(CH$_3$)COOCH$_2$COOCH$_2$CH=CH$_2$,
$CH_2$=CHCON(CH$_2$CH=CH$_2$)$_2$,
$CH_2$=C(CH$_3$)CON(CH$_2$CH=CH$_2$)$_2$,
$CH_2$=C(CN)CON(CH$_2$CH=CH$_2$)$_2$,
$CH_2$=CHCON(CH$_3$)CH$_2$CH=CH$_2$,
$CH_2$=C(CH$_3$)CON(CH$_3$)CH$_2$CH=CH$_2$,
$CH_2$=CHCON(C$_6$H$_5$)CH$_2$CH=CH$_2$,
$CH_2$=C(CH$_3$)CON(C$_6$H$_5$)CH$_2$CH=CH$_2$,
$CH_2$=C(CN)CON(C$_6$H$_5$)CH$_2$CH=CH$_2$,
$CH_2$=CHCOOCH$_2$CON(CH$_3$)CH$_2$CH=CH$_2$,
$CH_2$=CHCOOCH$_2$CON(CH$_2$CH=CH$_2$)$_2$,
$CH_2$=C(CH$_3$)COOCH$_2$CON(CH$_2$CH=CH$_2$)$_2$,
$CH_2$=CHCOOCH$_2$CH$_2$OCH$_2$CH$_2$N(CH$_2$CH=CH$_2$)$_2$,
$CH_2$=CHC$_6$H$_4$CH$_2$CH=CH$_2$,
$CH_2$=C(CH$_3$)C$_6$H$_4$CH$_2$CH=CH$_2$,
$CH_2$=C(CN)C$_6$H$_4$CH$_2$CH=CH$_2$,
$CH_2$=CHC$_6$H$_4$OCH$_2$CH=CH$_2$,
$CH_2$=C(CH$_3$)C$_6$H$_4$OCH$_2$CH=CH$_2$,
$CH_2$=C(CH$_3$)C$_6$H$_4$OCH=CH$_2$,
$CH_2$=CHC$_6$H$_4$OCH=CH$_2$,
$CH_2$=C(CH$_3$)C$_6$H$_4$OCH=CH$_2$,
$CH_2$=CHC$_6$H$_4$OCH$_2$CH$_2$OCH=CH$_2$,
$CH_2$=C(CH$_3$)C$_6$H$_4$OCH$_2$CH$_2$OCH=CH$_2$,
$CH_2$=C(CH$_3$)C$_6$H$_4$(OCH$_2$CH$_2$)$_3$OCH$_2$CH=CH$_2$,
$CH_2$=C(CN)C$_6$H$_4$(OCH$_2$CH$_2$)$_5$OCH$_2$CH=CH$_2$,
$CH_2$=CHC$_6$H$_4$SCH$_2$CH$_2$OCH$_2$CH=CH$_2$,
$CH_2$=CHC$_6$H$_4$OCH$_2$CH$_2$SCH$_2$CH=CH$_2$,
$CH_2$=CHC$_6$H$_4$COOCH=CH$_2$,
$CH_2$=CHC$_6$H$_4$COOC(CH$_3$)=CH$_2$,
$CH_2$=CHC$_6$H$_4$COOCH$_2$CH=CH$_2$,
$CH_2$=CHC$_6$H$_4$COOCH$_2$C(CH$_3$)=CH$_2$,
$CH_2$=C(CH$_3$)C$_6$H$_4$COOCH=CH$_2$,
$CH_2$=C(CH$_3$)C$_6$H$_4$COOC(CH$_3$)=CH$_2$,
$CH_2$=C(CH$_3$)C$_6$H$_4$COOCH$_2$CH=CH$_2$,
$CH_2$=C(CH$_3$)C$_6$H$_4$COOCH$_2$C(CH$_3$)=CH$_2$,
$CH_2$=CHC$_6$H$_4$CH$_2$COOCH$_2$CH=CH$_2$,
$CH_2$=CHC$_6$H$_4$CH$_2$CH$_2$COOCH$_2$CH=CH$_2$,
$CH_2$=CHC$_6$H$_4$CH$_2$COOCH=CH$_2$,
$CH_2$=C(CH$_3$)C$_6$H$_4$CH$_2$COOCH$_2$CH=CH$_2$,
$CH_2$=CHC$_6$H$_4$CH$_2$OCH$_2$CH=CH$_2$,
$CH_2$=C(CH$_3$)C$_6$H$_4$CH$_2$OCH$_2$CH=CH$_2$,
$CH_2$=CHC$_6$H$_4$N(CH$_3$)CH$_2$CH=CH$_2$,
$CH_2$=CHC$_6$H$_4$N(CH$_2$CH=CH$_2$)$_2$,
$CH_2$=CHC$_6$H$_4$CH$_2$N(CH$_3$)CH$_2$CH=CH$_2$,
$CH_2$=CHC$_6$H$_4$CH$_2$N(CH$_2$CH=CH$_2$)$_2$,
$CH_2$=C(CH$_3$)C$_6$H$_4$N(CH$_3$)CH$_2$CH=CH$_2$,
$CH_2$=C(CH$_3$)N(CH$_2$CH=CH$_2$)$_2$,
$CH_2$=C(CH$_3$)C$_6$H$_4$CH$_2$N(CH$_3$)CH$_2$CH=CH$_2$,
$CH_2$=C(CH$_3$)C$_6$H$_4$CH$_2$N(CH$_2$CH=CH$_2$)$_2$,
$CH_2$=CHC$_6$H$_4$SO$_2$OCH$_2$CH=CH$_2$,
$CH_2$=CHC$_6$H$_4$COOCH$_2$COOCH$_2$CH=CH$_2$,
$CH_2$=C(CH$_3$)C$_6$H$_4$COOCH$_2$COOCH$_2$C(CH$_3$)=CH$_2$,
$CH_2$=CHC$_6$H$_4$COO(CH$_2$)$_5$COOCH=CH$_2$,
$CH_2$=CHC$_6$H$_4$COO(CH$_2$)$_5$COOCH$_2$CH=CH$_2$,
$CH_2$=CHC$_6$H$_4$COO(CH$_2$)$_5$COOCH$_2$C(CH$_3$)=CH$_2$,
$CH_2$=C(CH$_3$)C$_6$H$_4$COO(CH$_2$)$_5$COOCH$_2$CH=CH$_2$,
$CH_2$=C(CH$_3$)C$_6$H$_3$(CH$_3$)COO(CH$_2$)$_5$COOCH$_2$CH=CH$_2$,
$CH_2$=CHC$_6$H$_4$COOCH$_2$CH$_2$OCH=CH$_2$,
$CH_2$=CHC$_6$H$_4$COOCH$_2$CH$_2$OCH$_2$CH=CH$_2$,
$CH_2$=CHC$_6$H$_4$COOCH$_2$CH$_2$N(CH$_2$CH=CH$_2$)$_2$,
$CH_2$=CHC$_6$H$_4$COO(CH$_2$)$_3$N(CH$_3$)CH$_2$CH=CH$_2$,
$CH_2$=C(CH$_3$)C$_6$H$_4$CON(CH$_2$CH=CH$_2$)$_2$,
$CH_2$=CHC$_6$H$_4$CON(CH$_2$CH=CH$_2$)$_2$,
$CH_2$=CHC$_6$H$_4$CON(CH$_3$)CH$_2$CH=CH$_2$,
$CH_2$=C(CH$_3$)C$_6$H$_4$CON(CH$_3$)CH$_2$CH=CH$_2$,
$CH_2$=CHC$_6$H$_4$CON(CH$_3$)CH$_2$CH$_2$NCH$_3$(CH$_2$CH=CH$_2$),
$CH_2$=CHC$_6$H$_4$CON(C$_6$H$_5$)CH$_2$CH$_2$N(CH$_2$CH=CH$_2$)$_2$, $CH_2=C(CN)C_6H_4COOCH_2CH=CH_2$, $$CH_2=C(CN)C_6H_4COOCH_2C=CH_2.$$
$$\quad\quad\quad\quad\quad\quad\quad\quad\quad |$$
$$\quad\quad\quad\quad\quad\quad\quad\quad\quad CH_3$$

This invention will be more fully described by the following examples. The invention is not to be regarded, however, as restricted in any way by these examples and they are to serve merely as illustrations. In these examples, as well as throughout the specification, "parts" and "percentages" shall mean parts by weight and percentages by weight unless specifically provided otherwise.

Example I

*Part A.*—To a reaction flask equipped with a stirrer and necessary accessories, and containing a dry, inert atmosphere of nitrogen is added 250 parts of purified tetrahydrofurane and 20 milliequivalent of lithium naphthalene (prepared by the process described in J. Am. Chem. Soc., 58, 2442 (1936)) in 6 parts of tetrahydrofurane and the mixture cooled to −77 to −78° C. To this green-black solution, there is added 15.6 parts of styrene (150 milliequivalents) and the color changes to dark red. The solution is then allowed to come to room temperature and it contains the polystyrene dianion

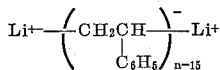

with a $\overline{DP}$ value of about 15 and a molecular weight of about 1550. The dianionic nature of the polymer is proven readily by reaction with carbon dioxide according to Nature, 178, 1168 (1956), and J. Am. Chem. Soc., 78, 2656 (1956) to give

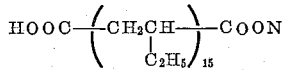

*Part B.*—If in this procedure there is added originally 31.2 parts of styrene, or if an additional 15.6 parts of styrene are added after the original addition, then the dianion will be of an average molecular weight twice that of the original dianion, thus

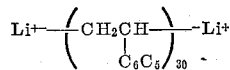

*Part C.*—If a total of 156 parts of styrene in 1500 parts of tetrahydrofurane are used, then the molecular weight of the polymeric dianion is correspondingly larger, thus

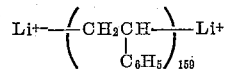

*Part D.*—However, if 15,600 parts of styrene in 25,000 parts of tetrahydrofurane are used, the dianion is

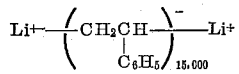

*Part E.*—Alternately, when the amount of initiator is increased, such as when two equivalents of lithium naphthalene are used with 416 parts of styrene in 1200 parts of tetrahydrofurane, the average value of $\bar{n}$ in the dianion is 4, or

Example II

Example I is repeated using equivalent quantities of sodium naphthalene, potassium naphthalene, and cesium anthracene and the corresponding dianions,

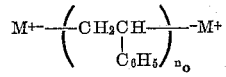

are obtained.

Example III

In a suitable reactor containing a dry nitrogen atmosphere, are placed 150 parts of distilled $$CH_2=C(CH_3)C_6H_5$$

and 4 parts of metallic potassium in pellet form, and the reaction allowed to proceed at 15–17° C. for 12 hours with continuous agitation. Then the viscous mixture is filtered to remove any unreacted potassium and the solution consists of about 75 parts of unreacted alpha methyl styrene and about 75 parts of the polymeric dianion,

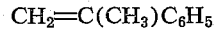

The excess alpha methyl styrene can be removed by vacuum distillation at a pressure of 1 mm. or less, and the inherent viscosity of 0.5% solution of the isolated polymer in toluene at 25° C. is about 0.74. The excess unreacted alpha methyl styrene can also be separated from the polymeric dianion by extraction with liquid hexane, and the dianion dissolved in tetrahydrofurane for further reaction.

Alternately, the procedure of Examples I and II can be used with tetrahydrofurane as the solvent for the reaction and the polymer allowed to remain in solution without isolation and used for further reactions.

When equivalent amounts of lithium or sodium are substituted in the procedure of this example, similar results are obtained. However, the rates differ and their speeds are in the following order K>Li>Na, and an increase in reaction time is necessary if higher conversions are required.

Example IV

The procedure of Example I is repeated using equivalent amounts of sodium benzophenone and the equivalent dianions,

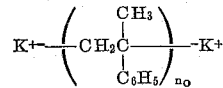

are obtained.

Example V

The procedure (Part A) of Example I is repeated using equivalent amounts of acrylonitrile (7.95 parts=150 millequivalents) and the corresponding polyacrylonitrile dianions,

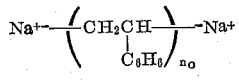

are obtained as precipitates in the tetrahydrofurane. When this procedure is repeated at −50° C. using 250 parts of redistilled dimethyl formamide instead of tetrahydrofurane as the solvent, then the polymeric dianion is obtained in solution.

Example VI

Example V is repeated using dimethyl formamide as the solvent and 10.35 parts of methacrylonitrile, and there is obtained in solution the polymeric dianion,

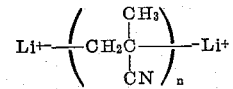

Example VII

Example VI is repeated using 14.4 parts of cyanomethyl acrylate and there is obtained the polymeric dianion,

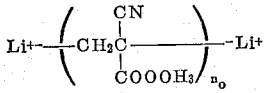

Example VIII

Example VI is repeated using 12.75 parts of $$CH_2=CHCON(CH_3)_2$$

and there is obtained the polymeric dianion,

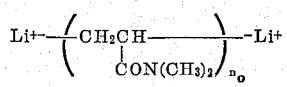

Example IX

The procedure (Part C) of Example I is repeated using 129 parts of methyl acrylate instead of styrene, and there is obtained the dianionic polymer,

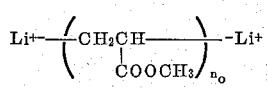

Example X

The procedure (Part C) of Example I is repeated using 150 parts of methyl methacrylate instead of the styrene and there is obtained the polymeric dianion,

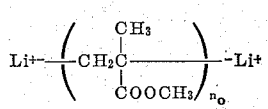

Example XI

The procedure (Part B) of Example I is repeated using 43 parts of ethyl acrylate to produce the dianionic polymer,

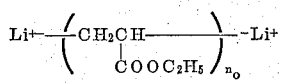

and then without isolating the product, 100 parts of methyl methacrylate are added to produce the A block having the structure

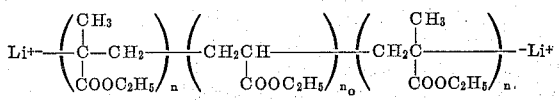

Example XII

The procedure (Part B) of Example I is repeated using a monomer mixture of 43 parts of ethyl acrylate and 50 parts of methyl methacrylate and a random copolymer A block containing structure units of both monomers is obtained,

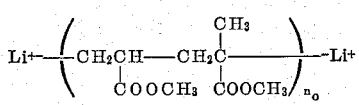

Example XIII

The procedure (Part C) of Example I is repeated using 104 parts of styrene, and after the addition of the styrene is completed there is added 172 parts of ethyl acrylate. After its addition is completed there is added 284 parts of butyl methacrylate, and there is obtained the tripolymer block A,

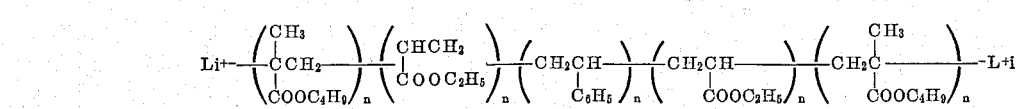

Example XIV

To 50 parts of tetrahydrofurane is added 0.75 part of butadiene and 0.14 part of finely divided metallic lithium, and the mixture allowed to stand at room temperature until the metallic lithium disappears and there is obtained a mixture comprising substantially $LiCH_2CH=CHCH_2Li$, and to this mixture is added, after cooling to $-40°$ C., 2400 parts of tetrahydrofurane and 1000 parts of styrene. The reaction is continued for 18 hours and there is obtained a dianion polymer,

Example XV

The procedure of Example V is repeated using dimethyl formamide as the liquid medium containing a mixture of 7.95 parts of acrylonitrile, 2.4 parts of ethyl acrylate and a random copolymer dianion,

is obtained.

Example XVI

The formation of the di-block from polymeric dianions is illustrated by using polymer A of Example I, adding to the solution of the dianion, at $-77°$ C., 2.24 parts of allyl acrylate, and allowing the reaction to proceed for two hours. There is obtained the polymer

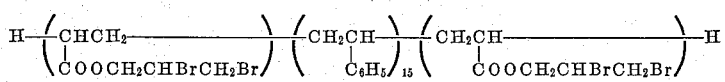

This is confirmed by bromination in toluene of a sample of the polymer isolated by precipitation of an aliquot part of the solution in methanol to give the derivative

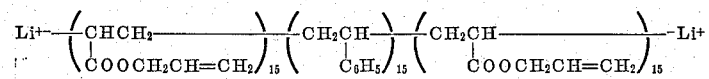

By further addition to the solution of an additional 31.4 parts of allyl acrylate there is obtained the di-block of approximate composition The solution is then neutralized with acetic acid and filtered. To a sample of the solution is added 0.1% benzoyl peroxide by weight of the polymer and films cast on glass. The solvent is allowed to evaporate at 50° C. and the solvent-dried film heated at 125° C. for 30 minutes. Tests with benzene, toluene, acetone, dioxane, and ether confirm that the polymer film is insoluble and infusible.

Example XVII

Example XVI is repeated using polymers of Parts B, C, D, and E of Example I with 2.24 parts of allyl acrylate followed by an additional 31.4 parts of allyl acrylate, and di-block copolymers containing post-reactive B blocks at the ends of the chains are obtained in all cases.

Example XVIII

Qualitative tests are made using the procedure of Example XVI with polymer A and 5 parts of each of the following B monomers:

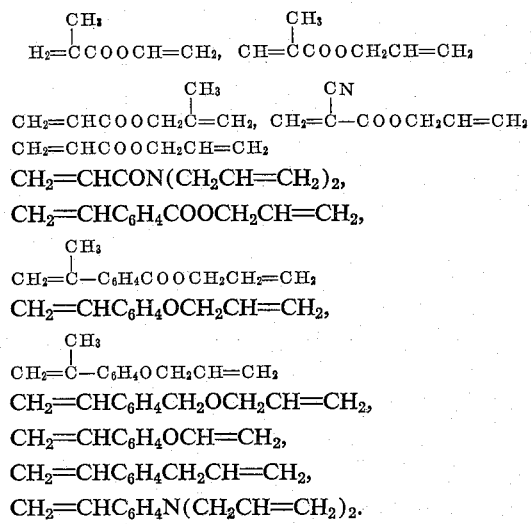

$CH_2=CHCON(CH_2CH=CH_2)_2$, $CH_2=CHC_6H_4COOCH_2CH=CH_2$,

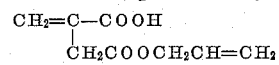

$CH_2=CHC_6H_4OCH_2CH=CH_2$, $$CH_2=\overset{CH_3}{\underset{|}{C}}-C_6H_4OCH_2CH=CH_2$$

$CH_2=CHC_6H_4CH_2OCH_2CH=CH_2$, $CH_2=CHC_6H_4OCH=CH_2$, $CH_2=CHC_6H_4CH_2CH=CH_2$, $CH_2=CHC_6H_4N(CH_2CH=CH_2)_2$.

In all cases, insoluble, infusible polymers are obtained when the polymers are heated at 125–130° C.

Example XIX

In a suitable reactor equipped with stirrer is charged 300 parts of styrene and 3000 parts of hexane under an inert anhydrous nitrogen atmosphere at a temperature of 25° C. To this solution is added 3 millimoles of naphthalene-lithium and the temperature rises to about 45° C. Stirring is continued for six hours at 25–30° C. The reduced viscosity of the polymer at this stage, isolated from an aliquot part of the solution and determined at 30° C. at a concentration of 0.2 gm./100 cc. benzene, is 0.18. The solution is then cooled to −10° C., 100 parts of allyl methacrylate are added, the mixture is stirred for an additional 4 hours at −10 to −5° C. for 4 hours, and then allowed to come to room temperature. The solution is then added to methanol (10,000 parts) and the resultant white precipitate is the di-block copolymer filtered and dried to yield 400 parts of product having a reduced viscosity of 0.48 when 0.2 gm. of the di-block is dissolved in 100 ml. benzene at 30° C.

Example XX

Ten parts of the polymer of Example XIX are dissolved in 30 parts of a mixture of 10 parts of dioxane and 20 parts of toluene. A film is cast on glass from part of the solution, and the solvent allowed to evaporate therefrom at room temperature. At the end of 48 hours the film is still soluble in acetone, toluene, dioxane, and carbon tetrachloride.

When a portion of this film is (a) heated at 150° C. for 30 minutes or (b) irradiated with a van der Graaf linear accelerator or a cobalt 60 source to a dose of 5 or more megareps, the films become insoluble in these same solvents. To another portion of the solution is added benzoyl peroxide in an amount to correspond to 0.5% by weight of the polymer. A film is cast from this solution and the solvent is allowed to evaporate at room temperature for 48 hours. When this latter film is heated at 135–150° C. for two minutes, it becomes insoluble and infusible.

Example XXI

To 40 parts of the polymer of Example XIX is added 0.4 part of benzoyl peroxide and the mixture ball-milled to uniformity for 15 minutes. The mixture is then pressed in a heated compression mold for 2 minutes at 150° C. and a well-fused, well-knit thermoset molding obtained, which is insoluble in benzene and toluene.

Similar results are obtained when other catalysts, such as 2,2-azo-bis-isobutyronitrile, lauroyl peroxide, tertiary butyl perbenzoate, etc., are used instead of benzoyl peroxide.

Example XXII

Impregnated sheet stock is prepared by dipping sheets of cellulose paper in the polymer solution of Example XX containing benzoyl peroxide, and the sheets dried at 100° C. for 15 minutes. Six sheets are superimposed and placed between the platens of a press and heated to 135° C. for 15 minutes at a pressure of 200 p.s.i., and a well-bonded, thermoset laminated product obtained.

Example XXIII

To a solution of 10 parts of the polymer of Example XIX and 30 parts of tetrahydrofurane is added 0.1 part of benzoyl peroxide and 2 parts of allyl monoitaconate, $$CH_2=\underset{|}{C}-COOH$$
$$CH_2COOCH_2CH=CH_2$$

and films prepared on freshly sanded iron, steel, copper and aluminum sheets and cured at 160° C. for 1 hour. In all cases, the coating yield is quantitative and the bond of the films to the sheets is excellent. Instead of monoallyl itaconate, other acidic monomers such as acrylic acid, methacrylic acid, maleic half esters, etc., are used and similar results are obtained.

Example XXIV

Ten parts of the polymer of Example XIX are mixed with 20 parts of commercial divinyl benzene (a 50–50 mixture of divinyl benzene and ethyl vinyl benzene) containing 0.3 part of benzoyl peroxide. To the resulting viscous mixture is added 30 parts of ground mica to form a putty which is molded at 140° C. at a low pressure of 30–100 p.s.i. into heat- and solvent resistant structures. Similar results are obtained when the divinyl benzene is replaced by allyl methacrylate, glycol dimethacrylate, diallyl itaconate, diallyl fumarate, diallyl maleate, divinyl phthalate, diallyl phthalate, or divinyl succinate, etc.

XXV

Glass-woven fabric is dip-treated with a solventless commercial, liquid, unsaturated resin (50% styrene-50% phthalic modified glycol maleate containing 0.5% peroxy catalyst) in which is dissolved 10% by weight of the polymer of Example XIX. The coated fabric is converted to a glass laminate by stacking 4 sheets between metal platens coated with zinc stearate and cured at 120° C. at 10 p.s.i. The laminate containing the polymer of Example XIX cures in less than 15 minutes and is more stiff and more heat-resistant than a similar laminate made from the same polyester not containing the polymer of Example XIX.

Example XXVI

To a mixture of 35 parts of toluene and 5 parts of acetone is added 15 parts of the polymer of Example XIX, 2 parts of allyl monoitaconate, 1 part of diallyl maleate and 0.5 part of 2,2′-azobis-isobutyronitrile and the mixture stirred until homogeneous. The inside of a clear iron pipe of 3″ I.D. is centrifugally spray-coated while the pipe is heated to 80° C. and rotated, the solvent is allowed to evaporate and the temperature raised to 170° C. Curing is continued for about 5 minutes. A solvent-resistant, heat-resistant, internal coating of good quality is obtained.

Example XXVII

Continuous strips of aluminum are coated with the polymer solution of Example XXVI and heated to 60° C. The solvent-dried but uncured sheets are fabricated into cans by the process of U.S. Patent 2,982,457, May 2, 1961. After forming the fabric sheets are clamped while on the mandril and heated to 200° C. for 30 seconds. Heat-resistant, tubular laminated cans are obtained. When the treated strips are spiral-wound and then heat-treated as in the making of the can, then continuous pipe is produced. Similar results are obtained when copper, iron, silver, etc., metals are processed in the same way as the aluminum strips.

Example XXVIII

An enamel is produced by adding milled TiO₂ pigment to the polymer solution of Example XXVI so that the pigment-binder ratio is 60-40. The faces of surface-ground concrete blocks are coated with the enamel, the solvent is allowed to evaporate at 60° C., and the coated blocks are heated at 180° C. for 15 minutes in a continuous oven. A glassy, porcelain-like finish which is water, heat, and solvent resistant is obtained on each block. A similar finish is obtained with this enamel on oak, maple, cedar, pine, and mahogany panels, as well as on fiberboards, asbestos panels, and concrete castings.

Example XXIX

To a mixture of 35 parts of toluene and 15 parts of acetone is added 15 parts of the polymer of Example XIX, and 0.5 part of benzoyl peroxide; and it is stirred until homogeneous. There is then added 2 parts of glycidyl acrylate and films prepared on freshly sanded, surface oxidized sheets of iron, copper, brass and aluminum. The sheets are cured at 160° C. for 2 hours, and an excellent bond is formed between the polymer and the metal. Good results are also obtained when 0.5, 1.0, and 1.5 parts of glycidyl acrylate are used instead of 2 parts, with slightly improved bonding being evident when 1.5 and 2.0 parts are used over that obtained with 0.5 and 1.0 part. Similar results are obtained when instead of glycidyl acrylate, there is used

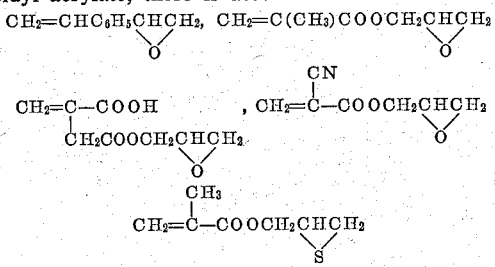

etc.

Example XXX

Example XXIX is repeated using instead of glycidyl acrylate, the monomer

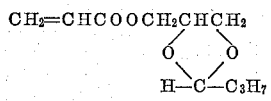

and the resulting polymer exhibits tenacious adhesion to cellulose, metals, and especially glass. When the

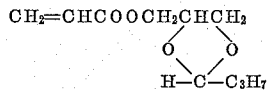

used in this example is replaced by related monomers, such as

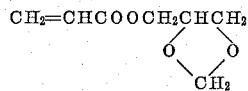

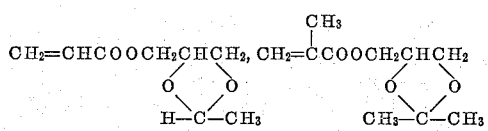

etc., and similar results are obtained.

Example XXXI

Example XXIX is repeated and instead of glycidyl acrylate there is used the monomer $$CH_2=CHCOOCH_2CH_2N(CH_3)_2$$

The resulting cured films exhibit great adhesion to metals, glass, ceramics, and especially to cellulose products. Similar improved properties are obtained when the N,N-dimethylaminoethyl acrylate is replaced by related monomers such as $CH_2=CHCOOCH_2CH_2U(C_2H_5)_2$,
$CH_2=C(CH_3)COOCH_2CH_2N(CH_3)_2$,
$CH_2=C(CH_3)COOCH_2CH_2N(C_2H_5)_2$,
$CH_2=C(CH_3)COOCH_2CH_2N(C_2H_5)_2$,
$CH_2=CHCOOCH_2CH_2N(C_3H_7)_2$,
$CH_2=CHCOOCH_2CH_2N(C_4H_9)_2$,
$CH_2=C(CH_3)COOCH_2CH_2N(C_4H_9)_2$, etc.

Example XXXII

The procedure of Example XIX is repeated using 600 parts of methyl methacrylate instead of 300 parts of styrene. The isolated di-block copolymer

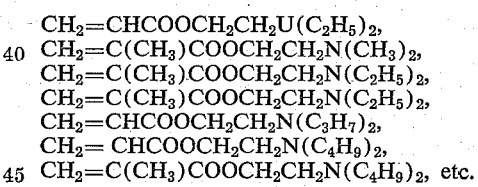

is converted to insoluble, infusible products by the procedures of Examples XX and XXXI inclusive with similar results.

Example XXXIII

The procedure of Example XIX is repeated using 60 parts of $CH_2=CHC_6H_4COOCH_2CH=CH_2$ instead of 100 parts of allyl methacrylate and the isolated di-block copolymer

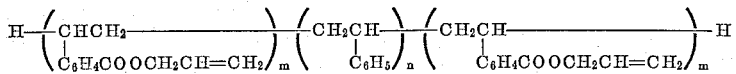

converted to the insoluble, infusible products by the procedures of Examples XX to XXXI inclusive. Similar results are obtained.

*Example XXXIV*

The procedure of Example XXXIII is repeated 10 times using instead of $CH_2=CHC_6H_4COOCH_2CH=CH_2$, 30 parts of each of the following monomers as B monomers:

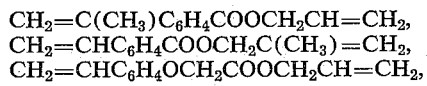

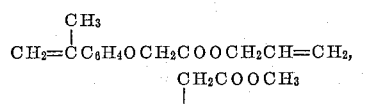

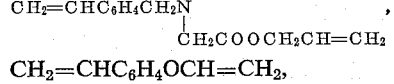

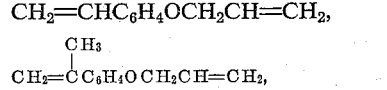

$CH_2=CHC_6H_4CH_2OCH_2CH=CH_2$, and

Similar insoluble polymer products are obtained when treated by the procedures of Examples XX to XXXI inclusive.

*Example XXXV*

The procedure of Example XIX is repeated using 300 parts of styrene and 15 parts of

A quantitative yield is obtained of the di-block polymer

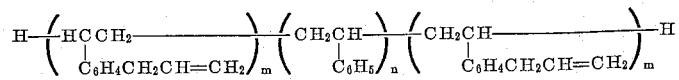

which is readily converted to insoluble, infusible products by the procedures of Examples XIX to XXXI inclusive.

*Example XXXVI*

To 40 parts of toluene is added 10 parts of the polymer of Example XXXV and 0.1 part of benzoyl peroxide. Films are cast on uncoated cellophane, dried at 60° for 10 hours and cured for 3 hours at 150° C., and an insoluble, infusible film, 15 mils thick, is obtained in each case which is separated from the cellophane by immersion in water and then redried. In each case, 5 parts of the dried film is immersed in a suitable reactor in an excess of fuming sulfuric acid (70% $H_2SO_4$; 30% $SO_3$) at 25° C. for 14 hours, then washed with dilute sulfuric acid and finally, with distilled water until free of $H_2SO_4$ and tested as an ion exchange resin. The resultant capacity is found to be equivalent to one —$SO_3H$ group per each benzene ring.

*Example XXXVII*

The dianions of Examples V to VIII, and XI to XV are converted to di-blocks with allyl acrylate by the procedure of Example XVI, and heat-curable di-blocks are obtained in all cases.

*Example XXXVIII*

Ten parts of the soluble, fusible di-block copolymer of Example XXXII are dissolved in 2 parts of diethyl fumarate and 15 parts of methyl methacrylate containing 0.1 part of benzoyl peroxide and the mixture is cast in a rod mold at 60° C. for 72 hours. The resulting rod is clear, hard and insoluble in acetone, benzene and carbon tetrachloride.

*Example XXXIX*

The dianions of Examples V to VIII and XI to XV are converted to di-blocks with 12.8 parts

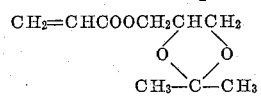

by the procedure of Example XVI. The polymers are isolated and dry-blended with 4 parts metaphenylene diamine and heated at 130° C. for 4 minutes. Infusible, insoluble polymers are obtained.

*Example XL*

Example XXXIX is repeated with the same dianions but with 11.4 parts of

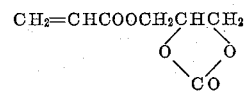

instead of

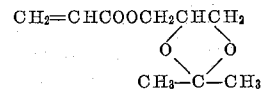

Insoluble, infusible polymers are obtained when the polymers are mixed with (a) 4 parts of metaphenyldiamine, (b) 3 parts of phthalic acid or 1 part of zinc chloride.

*Example XLI*

Example I is repeated to prepare the polystyrene dianion of DP of about 50, and then 270 parts of methacrylyl caprolactam,

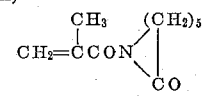

are added and the reaction continued at −20° C. for 4 hours. Then the Li is neutralized with acetic acid, the solution precipitated in methanol and the di-block

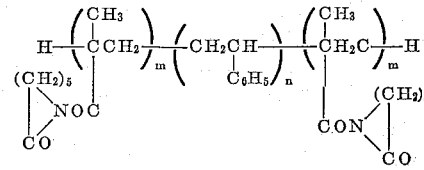

filtered and dried in vacuum. The dried polymer is mixed with 6% by weight of metaphenylenediamine and on heating to 140° C. becomes insoluble and infusible.

*Example XLII*

Example XLI is repeated and after the reaction with the methacrylyl caprolactam, 40 grams of allyl methacrylate are added and the reaction continued 4 hours longer. The di-block tripolymer

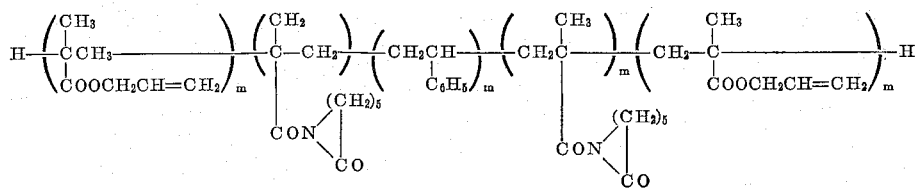

is obtained when isolated by the procedure of Example XLI. The dried polymer is mixed with 0.1% benzoyl peroxide and on heating to 150–155° C., becomes insoluble and infusible.

*Example XLIII*

Example I is repeated to prepare a polystyrene dianion of a DP of about 50 and 20 parts of $CH_2=CHC_6H_4NCO$ added and the reaction continued at 5° C. for 1 hour and the Li neutralized with $CO_2$ and the solution filtered. Films are cast from the solution and most of the solvent allowed to evaporate at 50° C. in a dry atmosphere, and then at 50° C. in an atmosphere of 30% relative humidity, followed by heating at 120° C. and insoluble, infusible films are obtained.

The polymers of this invention have an extremely wide range of utility for a number of reasons. They can be prepared in the fluid liquid, or moderately viscous, or highly viscous, or solid form; the permissible range of copolymerizations can involve two or three or more mnomers, even up to 10 or 20 if desired. In the uncured state they can be brominated and/or halogenated and converted to self-extinguishing polymers. They can be used as impregnants for all sorts of porous bodies or structures. They are useful as coating compositions and adhesives. They can be molded or heat-formed into infusible structures alone or with organic or inorganic fillers, including finely ground dusts as well as fibers. They can be converted to reinforced glass laminated structures alone or as modifiers for the unsaturated polyesters. They can be cast into intricate shapes and can be blended or otherwise compounded with other natural and synthetic oils, pitches, resins, and polymers. Some can be spun from solutions into fibers and then converted to heat and resistant fibers, flocks, and woven products. They can be post-modified with other monomers to improve their adhesive or bonding properties without impairment of their heat-resistant properties.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:
1. A linear block copolymer having the formula

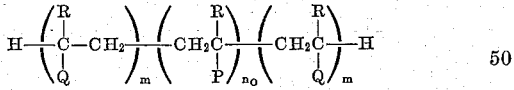

wherein
$n_0$ represents a numerical value of at least 4,
$m$ represents a numerical value of at least 1,
R is selected from the group consisting of —H, —$CH_3$, and —CN,
P is selected from the group consisting of —Ar, —Ar—Y', —CO—Y'',
Q is selected from the group consisting of —Ar—D, —CO—D', —Ar—NCO, —Ar—NCS,

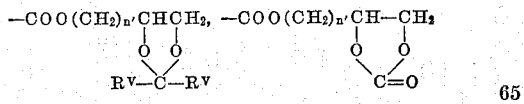

and

in which
—Ar is selected from the class consisting of aryl radicals containing 6 to 12 carbon atoms and derivatives thereof, and the derivatives thereof selected from the class of alkyl, cycloalkyl and aryl groups containing no more than 12 carbon atoms,
—Ar— is selected from the class consisting of arylene radicals containing 6 to 12 carbon atoms and derivatives thereof and the derivatives thereof selected from the class consisting of alkyl, aryl, cycloalkyl, alkoxy, aryloxy, thioalkyl, and thioaryl containing no more than 12 carbon atoms,
—Y' represents a radical selected from the class of —$OR^{IV}$, —$SR^{IV}$, —$COOR^{IV}$, —CN, —$O(CR_2^V)_nCOOR^{IV}$, —$S(CR_2)_n^VCOOR^{IV}$, —$(CR_2^V)_nCOOR^{IV}$, —$(CR_2^V)_nOR^{IV}$, —$(CR_2^V)_nSR^{IV}$, —$N(R^{IV})_2$, —$CON(R^{IV})_2$, —$(CR_2^V)_nN(R^{IV})_2$, —$(CR_2^V)_nCON(R^{IV})_2$, —$O(CR_2^V)_nCON(R^{IV})_2$, —$NR^V(CR_2^V)_nCOOR^{IV}$, —$(OCR_2^VCR_2^V)_nOR^{IV}$, —$CO(OCR_2^VCR_2^V)$ —$N(COOR^{IV})_2$,

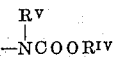

—$N[CR_2^V)_nCOOR^{IV}]_2$ and —$SO_2OR^{IV}$,
—Y'' is selected from the group consisting of —$OR^{IV}$, —$SR^{IV}$, —$O(CR_2^V)COOR^{IV}$, —$S(CR_2^V)COOR^{IV}$, —$O(CR_2^V)_nOR^{IV}$, —$N(R^{IV})_2$, —$O(CR_2^V)_nCON(R^{IV})_2$, —$OCR_2^V(CR_2^V)_nN(R^{IV})_2$, —$S(CR_2^V)_nCON(R^{IV})_2$, —$SCR_2^{IV}(CR_2^{IV})_nN(R_2^{IV})_2$,

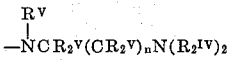

—$(OCR_2^VCR_2^V)_nOR^{IV}$,
—CO—D' represents a radical in which D' is selected from the class consisting of —OR'', —SR'', —$(OCR'_2)_nCOOR''$, —$S(CR'_2)_nCOOR''$, —$O(CR'_2)_nOR''$,

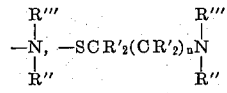

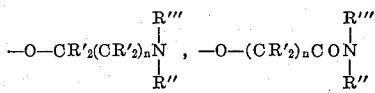

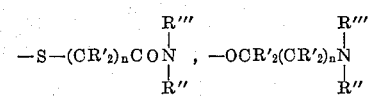

—$(OCR'_2CR'_2)_nOR''$;
—D represents a radical in which D' is selected from the class consisting of —$(CR'_2)_nR''$, —OR'', —SR'', —$O(CR'_2)_nCOOR''$, —$S—(CR'_2)_nCOOR''$, —COOR'', —$(CR'_2)_nCOOR''$, —$(CR'_2)_nOR''$, —$(CR'_2)_nSR''$,

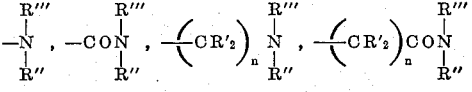

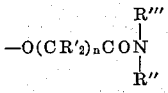

—$NR'''(CR'_2)_nCOOR''$,
—$N[(CR'_2)_nCOOR'']_2$,

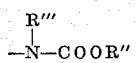

—$(OCR'_2CR'_2)_nOR''$,
—$CO(OCR'_2CR'_2)_nOR''$, —$N(COOR'')_2$, and —$SO_2OR'''$, wherein
R' is a radical selected from the class consisting of hydrogen and hydrocarbon radicals containing 1 to 10 carbon atoms and R'', R'' is a radical selected from the class of alkenyl, alkenyloxy alkyl, and alkenyl thioalkyl radicals, said radicals containing 2 to 10 carbon atoms and possessing a terminal $$CH_2=C<$$

group,

R''' is a radical selected from the class consisting of hydrocarbon radicals containing 1 to 12 carbon atoms and R'', $R^{IV}$ is a hydrocarbon radical selected from the class consisting of saturated aliphatic and cycloaliphatic radicals and aryl radicals, and containing 1 to 12 carbon atoms, $R^V$ is a radical selected from the class consisting of hydrogen and —$R^{IV}$, $R_c$ represents a radical selected from the group consisting of —H and —$CH_3$, $n$ represents a numerical value of 1 to 4.

2. A block copolymer of claim 1 which comprises the $$-CH_2-CH-\\ \;\;\;\;\;\;\;|\\ \;\;\;\;\;\;\;C_6H_5$$

repeating structure in the $$-CH_2-\overset{R}{\underset{P}{C}}-$$

structural unit and the repeating structure $$-CH_2-\overset{H}{\underset{COOCH_2CH=CH_2}{C}}-$$

in the $$-CH_2-\overset{R}{\underset{Q}{C}}-$$

P and Q being defined as in claim 1.

3. A block copolymer of claim 1 which comprises the repeating structure, $$-CH_2-CH-\\ \;\;\;\;\;\;\;|\\ \;\;\;\;\;\;\;C_6H_5$$

in the $$-CH_2-\overset{R}{\underset{P}{C}}-$$

structural unit, and the repeating structure, $$-CH_2-\overset{CH_3}{\underset{COOCH_2CH=CH_2}{C}}-$$

in the $$-CH_2-\overset{R}{\underset{Q}{C}}-$$

structural unit P and Q being defined as in claim 1.

4. A block copolymer of claim 1 which comprises the $$-CH_2-CH-\\ \;\;\;\;\;\;\;|\\ \;\;\;\;\;\;\;C_6H_5$$

repeating structure in the $$-CH_2-\overset{R}{\underset{P}{C}}-$$

structural unit, and the repeating structure, $$-CH_2CH-\\ \;\;\;\;\;\;\;|\\ \;\;\;\;\;\;\;C_6H_4COOCH_2CH=CH_2$$

in the $$-CH_2-\overset{R}{\underset{Q}{C}}-$$

structural unit P and Q being defined as in claim 1.

5. A block copolymer of claim 1 which comprises the repeating structure, $$-CH_2-CH-\\ \;\;\;\;\;\;\;|\\ \;\;\;\;\;\;\;C_6H_5$$

in the $$-CH_2-\overset{R}{\underset{P}{C}}-$$

structural unit, and the repeating structure, $$-CH_2CH-\\ \;\;\;\;\;\;\;|\\ \;\;\;\;\;\;\;C_6H_4OCH_2CH=CH_2$$

in the $$-CH_2N\overset{R}{\underset{Q}{C}}-$$

structural unit P and Q being defined as in claim 1.

6. A block copolymer of claim 1 which comprises the $$-CH_2-CH-\\ \;\;\;\;\;\;\;|\\ \;\;\;\;\;\;\;C_6H_5$$

repeating structure in the $$CH_2-\overset{R}{\underset{P}{C}}-$$

structural unit, and the repeating structure, $$-CH_2CH-\\ \;\;\;\;\;\;\;|\\ \;\;\;\;\;\;\;C_6H_4CH_2CH=CH_2$$

in the $$CH_2-\overset{R}{\underset{Q}{C}}-$$

structural unit P and Q being defined as in claim 1.

7. A block copolymer of claim 1 which comprises the repeating structure, $$-CH_2CH-\\ \;\;\;\;\;\;\;|\\ \;\;\;\;\;\;\;C_6H_5$$

in the $$CH_2-\overset{R}{\underset{P}{C}}-$$

structural unit, and the repeating structure, $$-CH_2CH-\\ \;\;\;\;\;\;\;|\\ \;\;\;\;\;\;\;C_6H_4CH_2OCH_2CH=CH_2$$

in the $$-CH_2-\overset{R}{\underset{Q}{C}}-$$

structural unit P and Q being defined as in claim 1.

8. A block copolymer of claim 1 which comprises the repeating structure, $$-CH_2\overset{CH_3}{\underset{C_6H_5}{C}}-$$

in the

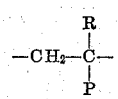

structural unit, and the repeating structure

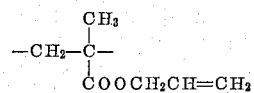

in the

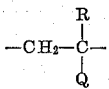

structural unit P and Q being defined as in claim 1.

9. A block copolymer of claim 1 which comprises the repeating structure,

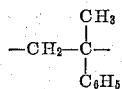

in the

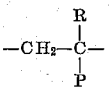

structural unit, and the repeating structure

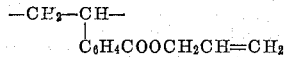

in the

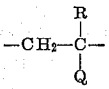

structural unit P and Q being defined as in claim 1.

10. A block copolymer of claim 1 which comprises the repeating structure,

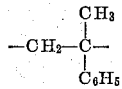

in the

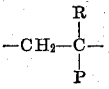

structural unit, and the repeating structure

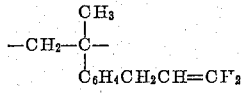

in the

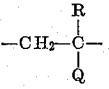

structural unit P and Q being defined as in claim 1.

11. A block copolymer of claim 1 in which comprises repeating structure,

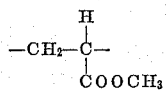

in the

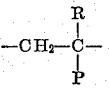

structural unit, and the repeating structure

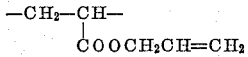

in the

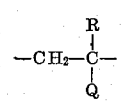

structural unit P and Q being defined as in claim 1.

12. A block copolymer of claim 1 which comprises the repeating structure,

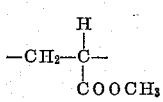

in the

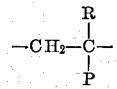

structural unit, and the repeating structure

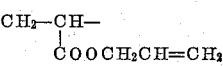

in the

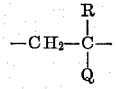

structural unit P and Q being defined as in claim 1.

13. A block copolymer of claim 1 which comprises the repeating structure,

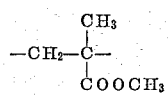

in the

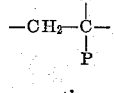

structural unit, and the repeating structure

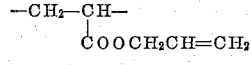

in the

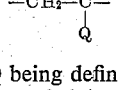

structural unit P and Q being defined as in claim 1.

14. A block copolymer of claim 1 which comprises the repeating structure,

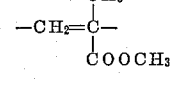

in the

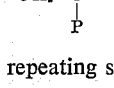

structural unit, and the repeating structure

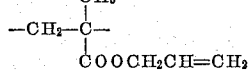

in the

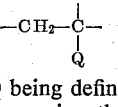

structural unit P and Q being defined as in claim 1.

15. The process of preparing the block copolymer of claim 1 which comprises reacting at least one monomer of the structure

with a polymeric dianion of the structure

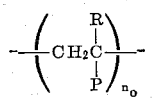

P and Q being defined as in claim 1.

16. The process of converting the block copolymer of claim 1 to the insoluble, infusible state which comprises heating the polymer in the presence of a radical generating catalyst.

17. The process of converting the block copolymer in claim 16 to the insoluble, infusible state in the presence of another ethylenic monomer.

References Cited by the Examiner

UNITED STATES PATENTS

| | | | |
|---|---|---|---|
| 2,500,265 | 3/1950 | Walling et al. | 260—86.1 |
| 2,912,418 | 11/1958 | Johnson et al. | 260—86.7 |
| 2,958,673 | 11/1960 | Jen | 260—885 |
| 2,963,453 | 12/1960 | Hwa et al. | 260—885 |
| 3,055,860 | 9/1962 | Baer et al. | 260—885 |
| 3,078,254 | 2/1963 | Felinski et al. | 260—885 |
| 3,110,706 | 11/1963 | Volment et al. | 260—86.7 |
| 3,251,905 | 5/1966 | Zelinski et al. | 260—879 |

FOREIGN PATENTS 653,696  12/1962  Canada.

MURRAY TILLMAN, *Primary Examiner.*

J. T. GOOLKASIAN, *Assistant Examiner.*